US010598485B2

(12) United States Patent
Setchell et al.

(10) Patent No.: US 10,598,485 B2
(45) Date of Patent: Mar. 24, 2020

(54) DEVICE AND METHOD TO LOCATE A MEASUREMENT POINT WITH AN IMAGE CAPTURE DEVICE

(71) Applicant: IMETRUM LIMITED, Bristol (GB)

(72) Inventors: Christopher John Setchell, Bristol (GB); James Alexander Sharam, Bristol (GB)

(73) Assignee: Imetrum Limited, Bristol Avon (GB)

(*) Notice: Subject to any disclaimer, the term of this patent is extended or adjusted under 35 U.S.C. 154(b) by 0 days.

(21) Appl. No.: 15/761,075

(22) PCT Filed: Sep. 16, 2016

(86) PCT No.: PCT/GB2016/052901
§ 371 (c)(1),
(2) Date: Mar. 16, 2018

(87) PCT Pub. No.: WO2017/051153
PCT Pub. Date: Mar. 30, 2017

(65) Prior Publication Data
US 2018/0259328 A1    Sep. 13, 2018

(30) Foreign Application Priority Data
Sep. 21, 2015  (GB) .................................. 1516650.7

(51) Int. Cl.
*G01S 1/04*        (2006.01)
*G01S 17/66*      (2006.01)
(Continued)

(52) U.S. Cl.
CPC ................. *G01C 1/04* (2013.01); *G01C 3/02* (2013.01); *G01C 15/002* (2013.01); *G01C 25/00* (2013.01);
(Continued)

(58) Field of Classification Search
CPC ........ G01C 1/04; G01C 15/002; G01C 25/005; G01C 3/02; G01S 3/7864; G01S 17/023; G01S 17/66
See application file for complete search history.

(56) References Cited

U.S. PATENT DOCUMENTS

| 5,473,368 A | 5/1995 | Hart |
| 6,034,722 A | 3/2000 | Viney et al. |
| 7,623,224 B2 | 11/2009 | Vogel |
| 2003/0048459 A1* | 3/2003 | Gooch ............... G01B 11/2545 356/620 |

(Continued)

FOREIGN PATENT DOCUMENTS

| CN | 201130008 | 12/2007 |
| CN | 103278180 | 5/2018 |

(Continued)

OTHER PUBLICATIONS

International Search Report/Written Opinion, PCT/GB2016/052901, filed Sep. 16, 2016, issued by European Patent Office dated Feb. 21, 2017, 19 pages.

(Continued)

*Primary Examiner* — Sang H Nguyen
(74) *Attorney, Agent, or Firm* — Fish & Richardson P.C.

(57) ABSTRACT

A measuring device (10) for determining the location of one or more measurement points relative to the measuring device. The measuring device is arranged to be coupled to a non-contact distance measuring device or EDM (12) and one or more sensors (16) for determining the orientation of the EDM. The measuring device comprises an image capture device or ICD (20) operable to output digital images and being arranged to be coupled to the EDM such that the ICD moves in known registration with respect to the EDM. A controller (28) is arranged to receive data from the one or more sensors and the ICD. The controller is configured to: a) associate an image with the orientation of the EDM during exposure of the image; b) locate one of the measurement points within the image; and c) use the location of the (Continued)

measurement point within the image in combination with the EDM orientation to establish the direction of the measurement point with respect to the measuring device.

30 Claims, 9 Drawing Sheets

(51) Int. Cl.
    *G01S 3/786*     (2006.01)
    *G01C 1/04*     (2006.01)
    *G01C 3/02*     (2006.01)
    *G01C 15/00*     (2006.01)
    *G01C 25/00*     (2006.01)
    *G01S 17/86*     (2020.01)

(52) U.S. Cl.
    CPC .......... *G01C 25/005* (2013.01); *G01S 3/7864* (2013.01); *G01S 17/66* (2013.01); *G01S 17/86* (2020.01)

(56) References Cited

U.S. PATENT DOCUMENTS

| | | | | |
|---|---|---|---|---|
| 2009/0138233 | A1* | 5/2009 | Kludas | G01C 15/00 702/158 |
| 2010/0085437 | A1 | 8/2010 | Troy et al. | |
| 2012/0120391 | A1 | 5/2012 | Dold et al. | |
| 2012/0262550 | A1 | 10/2012 | Bridges | |
| 2012/0262695 | A1* | 10/2012 | Faul | G01C 3/08 356/3.13 |
| 2012/0330601 | A1 | 12/2012 | Soubra et al. | |
| 2013/0335559 | A1* | 12/2013 | Van Toorenburg | G01C 3/08 348/135 |
| 2014/0267772 | A1 | 9/2014 | Morin et al. | |
| 2015/0116694 | A1* | 4/2015 | Van Toorenburg | G01S 17/023 356/4.01 |

FOREIGN PATENT DOCUMENTS

| | | |
|---|---|---|
| DE | 102011077678 | 12/2012 |
| WO | WO12081995 | 6/2012 |
| WO | WO2014139004 | 9/2014 |

OTHER PUBLICATIONS

Examination Report; GB1516650.7, dated Nov. 28, 2016, 4 pages.
Examination Report; GB1516650.7, dated Feb. 19, 2016, 6 pages.
Examination Report; GB1516650.7, dated Jul. 17, 2017, 4 pages.
Cosser et al., "Measuring the Dynamic Deformation of Bridges Using a Total Station", Proceedings, 11$^{th}$ FIG Symposium of Deformation Measurements, Santorini, Greece, 2003.
Paolo Casadei and Paul McCombine, "NDT Monitoring of Bridges using Innovative High Precision Surveying System", 2006.
Michael Scherer, "Intelligent Tacheometry with Integrated Image Processing Instead of 3D Laser Scanning?", INGEO 2004 and FIG Regional Central and Eastern European Conference on Engineering Surveying, Bratislava, Slovakia, Nov. 11-13, 2004.
Michael Scherer et al., "From the Conventional Total Station to the Prospective Image Assisted Photogrammetric Scanning Total Station", Journal of Surveying Engineering ASCE/ Nov. 2009, 173.
Guillaume et al., "QDaedalus : Augmentation of Total Stations by CCD Sensor for Automated Contactless High-Precision Metrology", TS09I—Engineering Surveying, 6002, 2012.
Unknown Author, http://www.elcovision.com/Flyer/Elcovision10_Viva_englisch.pdf, Online, Elcovision 10 for Viva, Product Flyer, Sep. 2015.
Werner Lienhart et al., "The impact of image assisted surveying and image based documentation on traditional surveying workflows", 2011.
Zhang et al., "Digital terrestrial photogrammetry with photo total station" School of Remote Sensing Information Engineering, Wuhan University, 129 Luoyu Road, Wuhan 430079, China, 2012.
Walser, B., "Development and calibration of an image assisted total station", Dissertation, ETH Zürich, Switzerland, 191 pages, 2004.
Dong et al., "Orientation of Images Captured With Video-Theodolites", International Archives of Photogrammetry and Remote Sensing, vol. XXXIII, Part B5, Amsterdam, 2000.
Kahmen et al., "Object Recognition With Video-Theodolites and Without Targeting the Object", University of Technology Vienna, Institute of Geodesy and Geophysics, 1999.
Thomas Luhmann et al., "Close-Range Photogrammetry and 3D Imaging", ISBN 978-3-11-030269-1, pp. 218-220, 2013.
Hauth et al., "Modular Imaging Total Stations—Sensor Fusion for high precision alignment", 3rd International Conference on Machine Control & Guidance Proceedings, 202-210, Stuttgart, Germany, Mar. 2012.
Unknown Author, "Guidance System" Part No. FA47260F, Ackkerman, 2 pages, 2013.
Juretzko, "Possibilities of a Video-Tacheometer", Geodätisches Institut, Universität Karlsruhe, Englerstraße 7, D-76128 Karlsruhe, 2005.

* cited by examiner

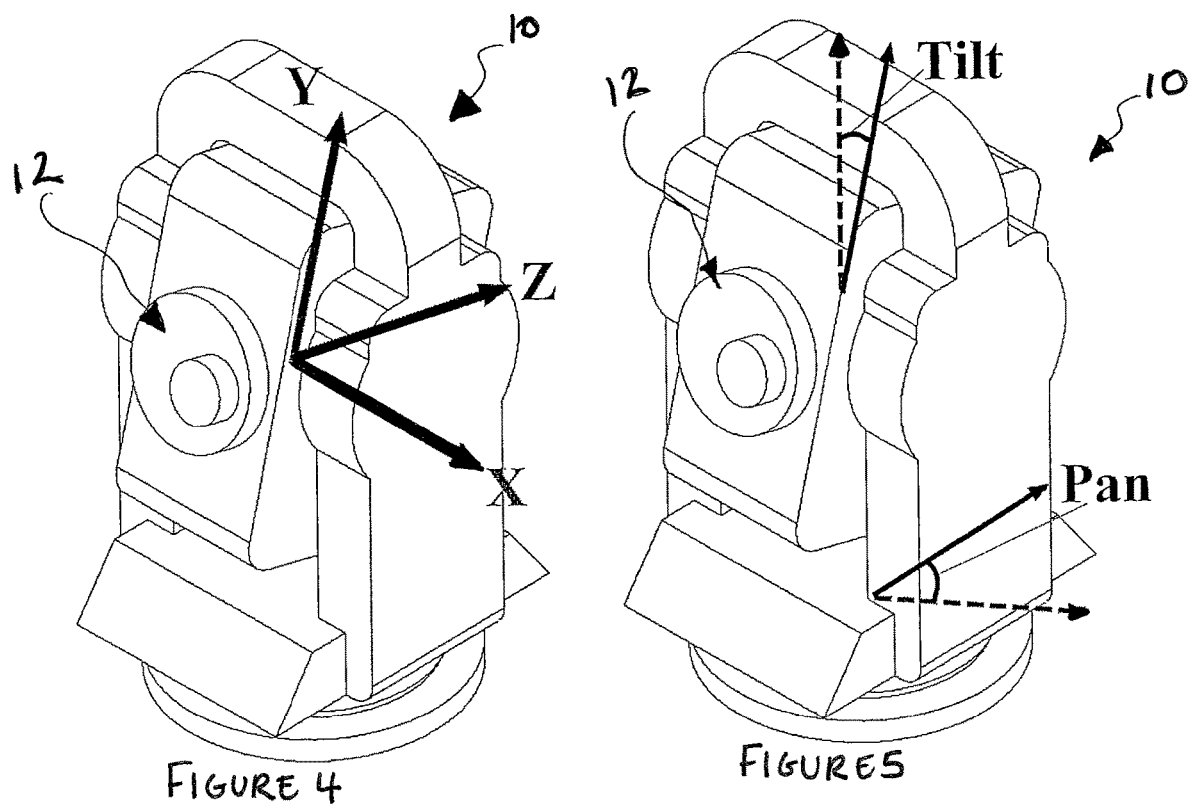

DEVICE AND METHOD TO LOCATE A MEASUREMENT POINT WITH AN IMAGE CAPTURE DEVICE

This application is a U.S. National Phase application of PCT/GB2016/052901 filed Sep. 16, 2016, which claims the benefit of Great Britain patent application number 1516650.7 filed Sep. 21, 2015, which is incorporated by reference herein.

BACKGROUND TO THE INVENTION

A known way of monitoring movement of structures such as buildings, bridges, dams, components/assemblies and the like is to use a surveying device such as a 'total station'. A total station consists of a laser-based electronic distance measure (EDM) mounted on a mechanical platform. The base of this platform is typically placed on a stable, horizontal mount, such as a leveled tripod. The total station mechanics allow the EDM to be aimed in any direction by rotating around both the vertical axis and a horizontal axis. Encoders on each rotation axis allow the current direction of the EDM to be known.

A monitoring total station can include a motorised drive system that allows the EDM to be automatically aimed in any desired direction. The current direction of the EDM from the encoders together with the distance to the measurement point from the EDM enables the three dimensional location of a point to be determined.

Total stations are capable of measuring positions of points in three dimensions. However, they have one or more of the following limitations when tasked with monitoring a moving structure:
  in order to monitor movement they require a reflective target to be attached to the measurement point;
  to achieve the required resolution and accuracy they typically require several seconds to perform each measurement and are therefore not able to perform dynamic measurement, such as movement of a railway track as a train passes over it;
  they can only measure a single point at a time; if multiple points are to be monitored then each must be measured sequentially i.e. data is only captured from a single point at a time;
  measurement resolution can be limited by the angular resolution of the encoders (typically in the order of 1 arcsecond); and
  some designs of reflective prisms can be a significant source of measurement error.

SUMMARY OF INVENTION

In accordance with a first aspect of the invention there is provided a measuring device according to claim 1.

Thus, the measuring device according to the first aspect associates the EDM direction during image exposure such that an algorithm can accurately find a measurement point within the image and determine where the measurement point is in relation to the device using the direction information. Image exposure occurs over a period of time. This means that accuracy is maintained even if the EDM orientation is changing during the image exposure. EDM orientation might be changing intentionally (e.g. it is tracking a moving measurement point) or unintentionally (e.g. vibration or thermal expansion of a mounting bracket/tripod).

Certain optional features of the measuring device are defined in claims 1 to 19. Additional optional features are set out below.

The ICD can be arranged to be coupled to the EDM such that the ICD moves in fixed registration with respect to the EDM.

The three of more measurement points used to define the plane recited in claim 14 can be captured by the features of claim 4.

In accordance with a further aspect of the invention, there is provided array of measuring devices according to claim 20. Optional features of the array are set out below.

The projected measurement points can be defined by the features of claim 4.

The following are optional features of the measurement devices and/or array according to all aspects of the invention.

The light can comprise a laser.

The ICD can comprise a digital camera and an optical unit coupled to the camera.

The EDM orientation can be associated with an image by using a single direction reading at some point during the exposure period, such as at the mid-point of the exposure period, or by combining multiple readings taken during the exposure period, such as the average of readings at the start and end of the exposure period.

The EDM can comprise a laser range finder.

The controller of each measurement device can be implemented in hardware or can contain computer program code configured to provide the stated functionality.

A measurement point can be located in an image by pattern recognition or feature detection.

In accordance with a further aspect of the invention, there is provided method of calibrating intrinsic and extrinsic image capture device (ICD) parameters for a measuring device according to claim 21. Certain optional features of the method are defined in claim 22. Additional optional features are set out below.

Steps (c), (d) and (e) of the method can comprise:
  if the ICD optical axis is coaxial with the EDM then:
    the EDM is turned, if necessary, to aim at the calibration point;
    the position of the calibration point within the image is recorded as (x0, y0);
    the pan and tilt angles of the EDM direction are recorded (h0 and v0); and
    the estimate of the location of the principal point can be updated to (x0, y0);
  otherwise:
    the EDM is turned, if necessary, until the calibration point is approximately aligned with the principal point;
    the position of the calibration point within the image is recorded as (x0,y0); and
    the pan and tilt angles of the EDM direction are recorded (h0 and v0).

The tilt at step (f) can be sufficient to place the calibration point close to the edge of the image. This can improve the accuracy of the calibration.

Steps (f) and (g) can be repeated for a plurality of tilt and/or pan angles.

The pin-hole camera model can be calculated using:

$$\text{focal length} = \text{pixel size } x|(x1,y1)-(x0,y0)|/\text{Tan}(\theta)$$

where:

θ is the angle between r0 and r1;

r0 is the ray corresponding to the optical axis when the EDM direction is at h0 and v0; and r1 is the result of rotating r0 around the EDM origin according to (h1−h0) and (v1−v0).

If steps (f) and (g) are repeated a plurality of times, then a parameterised lens distortion model can be solved for whereby:

an error function is formulated in terms of the discrepancies between observed image coordinates and projected image coordinates; and optimisation techniques are applied to solve for the parameters that minimise the error function.

If the ICD optical axis is not coaxial with the EDM and the distortion parameters have been solved for, then the centre of radial distortion can be taken as an estimate of the principal point.

This aspect can extend to a measurement device, such as that described with respect to the first aspect, that is configured to perform the methods of the present aspect.

In accordance with a further aspect of the invention, there is provided a method of determining the location of one or more measurement points according to claim 23. Certain optional features of the method are defined in claims 24 to 30. Additional optional features are set out below.

The optimisation procedure can comprise repeating steps (e) to (g) until one or more of the following termination criteria is met:

the perpendicular distance of the EDM image point from the ICD ray is relatively small;

the angular change in orientation of the EDM at an iteration is smaller than the resolution of the drive system or EDM direction sensors; and the number of iterations has exceeded a predefined limit.

The method can comprise:

using the current EDM direction together with a distance measurement to obtain a three dimensional coordinate of the EDM target point which now corresponds to the measurement point; or using a point along the ICD ray that is closest to the EDM target point to obtain a three dimensional coordinate for the measurement point.

The method can comprise:

determining whether the EDM direction or distance reading is changing during the exposure period and, if so, then accounting for a change in EDM direction or distance during the exposure period by:

using a single direction and/or distance reading from a point during the exposure period, for example a mid-point, or using multiple readings taken during the exposure period.

The method can comprise:

during image exposure directing a light which is aligned with the optical axis of the ICD, the light being mechanically coupled to the ICD to move in fixed registration with the ICD.

The angle of illumination can approximately match the angular field of view of the ICD.

The light can comprise a laser.

The method can comprise:

filtering the light entering the ICD with an integrated optical filter, such as a band-pass filter.

The method can comprise:

determining if one or more of the measurement points have moved outside of the ICD's field of view and if so then turning the EDM through a sequence of directions in order to search for and then bring the measurement points back into the field of view for location.

The method can comprise:

performing an auto-exposure process on one or more regions of interest (ROI) defined within the image, each ROI containing a measurement point; and moving an ROI in accordance with measured movement of the associated measurement point and/or in accordance with EDM direction data from the one or more sensors.

According to a further aspect of the invention there is provided a method according to claim 31. Optional features of this aspect are set out below.

The method can comprise:

repeating steps (p) and (q) to provide a stream of measurement data; one measurement for each image from the ICD of each measuring device.

The following are optional features of the methods according to all aspects of the invention.

Some or all of the method steps can be computer implemented.

BRIEF DESCRIPTION OF THE DRAWINGS

Embodiments of the invention will now be described, strictly by way of example only, with reference to the accompanying drawings, of which:

FIGS. 4 and 5 illustrate an EDM coordinate system;

DESCRIPTION OF THE EMBODIMENTS

As an overview, embodiments of the invention use an image capture device (ICD), such as a digital camera, in combination with a non-contact distance measure device (EDM) to address one or more of the limitations identified in the background section above. Such a device will be referred to in the following description as a 'hybrid device'. A hybrid device includes a controller configured to associate an image with the orientation of the EDM during exposure of the image, locate one of the measurement points within the image and use the location of the measurement point within the image in combination with the EDM orientation to establish the direction of the measurement point with respect to the hybrid device. The present inventors have found that a hybrid device and/or methods according to embodiments of the invention can have one or more of the following advantages relative to known systems:
- a capability of performing dynamic measurement;
- a capability of measuring multiple points simultaneously;
- a device which does not require reflective targets to be attached to the measurement points;
- a device which can provides all measurements in real units (e.g. mm);
- a device which can measure to significantly higher resolutions than existing total stations
- a device which can have a large measurement area e.g. any point that has a clear line of sight to the device can be monitored;
- a device which can measure dynamic movement;
- a device which can measure multiple points simultaneously;
- a device having a simple, quick calibration process that can be performed by a user in the field;
- a device which can make accurate measurements due to it having a robust method for aligning the EDM laser with a corresponding point in the image;
- a device which can make accurate measurements due to it having a robust method for managing changing illumination; and
- a device which can operate when ambient lighting is not sufficient for known device.

Hybrid Device

Figure 1:
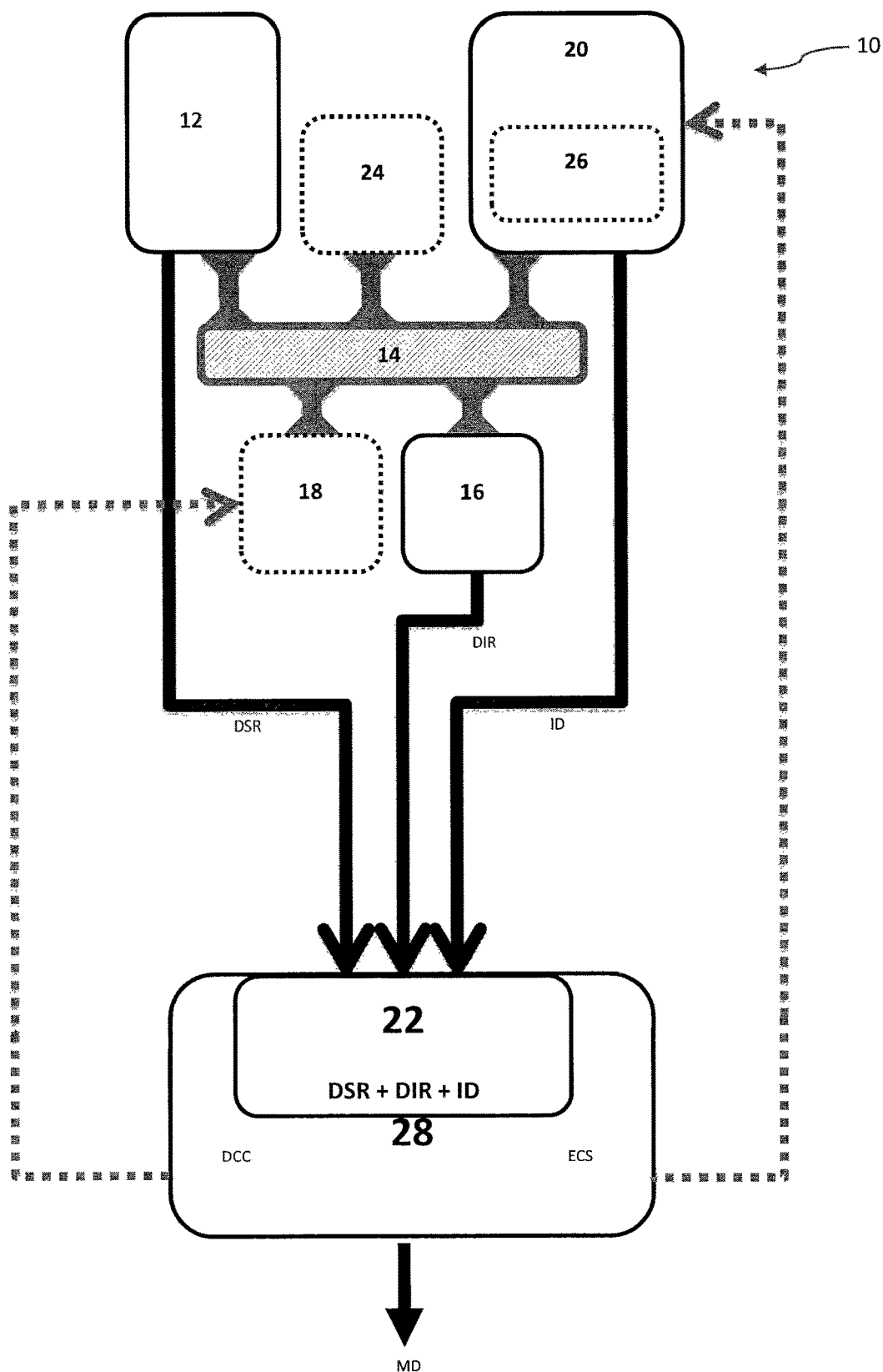
FIG. 1 is a block diagram of a hybrid device according to an embodiment of the invention.

Referring to FIG. 1, a hybrid device according to an embodiment of the invention is shown generally at 10.

The hybrid device 10 includes a non-contact distance measure device (EDM) 12 that is coupled to a mounting platform 14 and includes mechanics that allow the EDM 12 to be pointed in a range of directions. Sensors 16 are provided to detect the direction in which the EDM 12 is pointing. The hybrid device 10 may optionally include a drive system 18 that enables the EDM 12 to be driven to a specified direction. The EDM 12 can comprise any suitable device for performing non-contact distance measurement. The EDM 12, mounting platform 14, sensors 16 and drive system 18 can be the same as or similar to a known total station, laser scanner or laser tracker. The mounting platform 14 can be mounted on a secondary mount, such as a tripod (not shown).

The hybrid device 10 also includes an image capture device (ICD) 20, which in the illustrated embodiment is a camera 20. The camera 20 is coupled to the mounting platform 14 such that the camera 20 moves in fixed registration with the EDM 12. Although not a requirement, it is preferred that the camera's optical axis is approximately aligned with the EDM direction and in some embodiments the camera's optical axis may be coaxial with the laser of the EDM 12. Cameras are readily available that operate at hundreds of hertz. This enables highly dynamic movement to be monitored. With suitable lensing the camera can have a wide field of view and therefore monitor a large number of measurement points simultaneously. By using appropriate pattern recognition or feature detection techniques the camera can monitor movement without the need to attach targets at the measurement point. Using algorithms such as those described in PCT/GB2003/004606 enables angular movement measurements with a resolution in the order of 0.01 arcseconds i.e. 100 times better than typical total station encoders.

The hybrid device 10 also includes a controller 28 which is configured to: associate an image with the orientation of the EDM 12 during exposure of the image; locate one of the measurement points within the image; and use the location of the measurement point within the image in combination with the EDM orientation to establish the direction of the measurement point with respect to the measuring device, which can be used to output measurement data MD. The controller 28 includes a data synchronisation sub-system (DSS) 22 arranged such that the direction of the camera 20 and/or the EDM distance reading as they were during the image exposure period is known. This enables fusing of data from the camera 20 with data from the EDM 12/and sensors 16 and ensures accuracy should the camera 20 move or if the distance of the target from the hybrid device 10 should change. The camera 20 may move due to a number of causes, e.g.: a deliberate change in direction of the hybrid device 10 or movement of its mount, such as a change in tilt angle due to thermal expansion of a tripod leg. The distance from the hybrid device 10 to the target may be changing if the target is moving dynamically. The camera 20 direction can be deduced from the EDM direction sensors 16 and from calibration data. If the direction/distance is changing during the exposure period then strategies can include the use of a single direction/distance reading at some point during the exposure period, such as at the mid-point of exposure period, or combining multiple readings taken during the exposure period, such as the average of readings at the start and end of an exposure period.

The step of tagging or associating an image with the orientation of the EDM 12 during exposure of the image can be achieved in many ways. In one example, each distance reading from the EDM 12 and each direction reading from the direction sensors 16 is tagged with the timestamp of the reading. A simple data structure can be used to associate the timestamp and reading data. The EDM 12 and direction sensors 16 provide a stream of readings, typically at a rate that is significantly higher than the frame-rate of the ICD 20. The timestamped readings are placed in a buffer, such as a FIFO queue, that stores them for a finite period of time. Each image from the ICD 20 is tagged with timestamps marking the start and end of the exposure period of that image. When the DSS 22 receives an image it is then able to query the buffer for the set of required readings; for example, the EDM distance and direction readings at the start and end of the exposure period. These readings can then be combined in a suitable way, such as averaging, and the combined readings can then be associated with the image by any suitable means such as storing the combined readings and image in a simple data structure. The timestamps marking the start and end of exposure period and timestamps of the EDM distance/directions sensor readings come either from a common clock or, if multiple clocks are used, synchronised clocks.

The EDM distance readings can be timestamped within the EDM 12. Alternatively, the DSS 22 can associate the timestamp with the reading at the point when it receives the reading from the EDM 12. The latter approach requires that the latency between the actual reading being performed and the reading being received by the DSS 22 is insignificant, or at least known. Readings from the direction sensors 16 can be timestamped in a similar way.

Some ICDs are capable of timestamping images; for example, with a timestamp at the start of image exposure. If the ICD 20 is only able to timestamp the start of exposure but not the end, then the end timestamp can then be calculated by adding the known exposure period; the exposure period is known by the auto-exposure module within the controller 28. Conversely, if the ICD 20 is only able to timestamp the end of exposure, the start can be calculated by subtracting the known exposure period. Alternatively, it is common that ICDs can be controlled to start (and stop)

exposing using a digital trigger signal. If that trigger signal is generated by the controller 28 then the timestamps at start and end of exposure for each image will be known by the controller 28.

The controller 28 can provide drive control commands DCC to the drive system 18 and/or provide exposure control commands ECC to the image capture device 20. Exposure control can be achieved by varying the exposure period of the camera or changing the aperture size of the lens.

The controller 28 can consist of a combination of hardware and software. In one example, the hardware might include a processor, memory and input/output capability. For example, the hardware could be one or more microcontrollers, embedded computers, ASIC or a standalone computer such as a PC. An appropriate interface to communicate with the ICD 20 is provided and a method to communicate with the direction sensors 16, EDM 12, etc. The hardware, with suitable software, should be capable of handling data from the ICD 20 and also performing the functions of the hybrid device's controller 28. Some of these functions, such as 'point location', can be quite computationally intensive so the hardware should be suitably powerful. The skilled person will however be capable implementing the hybrid device according to embodiments of the invention based on the teaching provided herein in combination with his common general knowledge without undue burden. In some embodiments, the DSS 22 can be run on a separate controller that is communicatively coupled to the controller 28.

It should also be noted that many existing devices such as total stations will already contain a micro-controller or embedded computer that runs the firmware of the device.

Manufacturers of devices such as total stations commonly provide software development kits (SDK) that enable the functions of the device to be controlled programmatically via a software interface. In the case of a total station, it is common for the SDK to communicate with the total station via an interface such USB, RS232, ethernet (wired or wireless), Bluetooth™ or the like. The controller 28 of the hybrid device can then call appropriate software functions in the SDK to instruct the total station to perform turns, stream distance & angle data, etc. This approach means that a hybrid device 10 according to embodiments of the invention can be created via an 'add-on' for an existing total station.

Alternatively, for a fully integrated solution, the controller 28 of the hybrid device 10 can be implemented in software that runs on hardware that is integral to the total station. In this case, the hybrid device controller can communicate directly with the total station's firmware without going via the SDK.

The hybrid device 10 can optionally include an integrated light 24 arranged to allow operation even when ambient lighting is not sufficient, such as at night, in a tunnel, or under a bridge, without the need for additional external light sources. The direction of the light 24 is aligned with the optical axis of the camera 20 and the light 24 is coupled to the support 14 to move in fixed registration with the camera 20. The angle of illumination is optimal if it is approximately matched to the angular field of view of the camera 20. If the angular field of view of the camera 20 is appropriate then a laser source could be used and that laser source could be the same one used in the EDM 12 or the 'guide light' found in some known survey devices.

The hybrid device 10 can optionally include an integrated optical filter 26 arranged to reduce the impact of changing solar illumination. The optical filter 26 can be implemented as a band-pass filter to align it with the dip in the Sun's emission spectrum, which filters the light entering the camera 20. The optional light 24 can be matched to emit at this frequency in order to fill the gap in the Sun's emission spectrum. As will be appreciated, the spectrum of solar emission incident on the Earth has numerous dips. One of these dips is centred at approx. 937 nm, but others can be used.

The controller 28 is preferably configured to perform some or all of the following modules:

1. a point definition module for defining measurement points;
2. a point location module, which automatically locates a measurement point in an image using pattern recognition or feature detection algorithms;
3. a self-calibration module configured to ascertain any unknown camera intrinsic and extrinsic parameters;
4. an EDM alignment module; given a point in an image, which is tagged with the current EDM direction, this module aligns the EDM 12 such that it is aiming at that same point;
5. an intelligent auto-exposure module, which maintains optimal image exposure to facilitate operation of the point location module; and
6. a data fusion module, which combines measurement data from the point location module, the EDM 12 and the EDM direction sensors 16. Filtering can optionally be applied to the measurement data in order to improve signal to noise ratios. The data fusion module can combine data via various methods in order to provide several possible modes of operation:
    Mode 1—dynamically monitors multiple points that are moving within a plane. Multiple points are monitored simultaneously;
    Mode 2—static measurement of multiple points that may move in any direction. Multiple points are measured sequentially;
    Mode 3—dynamic measurement of a single point that may move in any direction; and
    Mode 4—dynamic measurement of multiple points that may move in any direction. Multiple points are measured simultaneously. This method requires two or more hybrid devices.

The above-mentioned modules will each be described in more detail below.

Some operations of the hybrid device 10, such as the point definition, may require a person to select a point in an image. The image will typically be displayed on a screen so a point can be selected simply by positioning a cursor at the desired position in the image using, for example, a mouse, track ball, joystick or touchscreen. The screen can be an integral part of the hybrid device or can be remote to the device, such as a tablet, PC or a dedicated remote control unit.

While the hybrid device 10 of the illustrated embodiment is a fully integrated solution, in other embodiments a hybrid device can comprise an ICD 20, and controller 28 arranged to be coupled to one or more of the other system elements, such as the mount 14 of an existing device such as a total station, laser scanner, laser tracker or theodolite.

Coordinate Systems

Referring additionally to FIGS. 2 to 9, the following coordinate systems will be referred to in this document.

Figure 2:
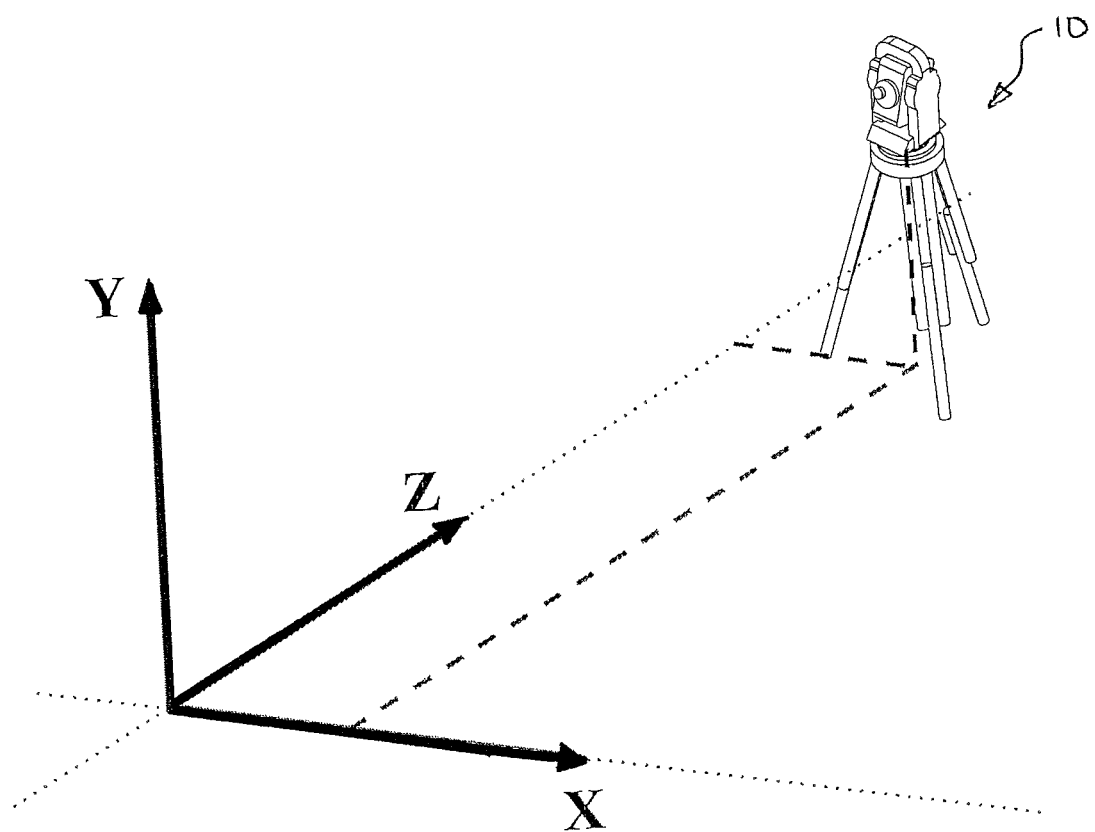
FIG. 2 illustrates a world coordinate system.

FIG. 2 illustrates a world coordinate system, which is a three dimensional (3D) global coordinate frame that measurement data will be provided in. The hybrid device 10 has a 3D position within the world coordinate system.

Figure 3:
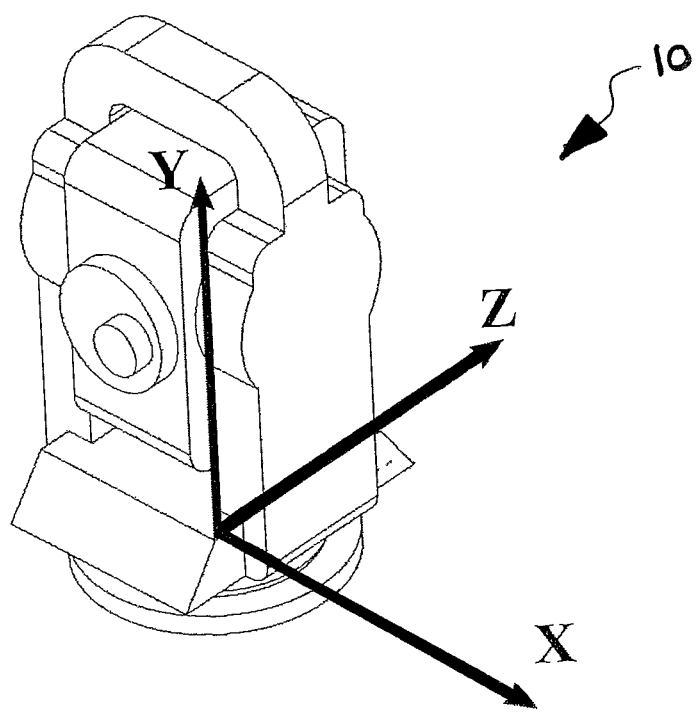
FIG. 3 illustrates a device coordinate system.

FIG. 3 illustrates a device coordinate system. This is attached to the hybrid device 10.

FIGS. 4 and 5 illustrate an EDM coordinate system. This is attached to the EDM 12 and moves with the EDM 12 as it is pointed in different directions. The EDM coordinate system typically has the same origin as the device coordinate system. For the purpose of the following description, the current orientation of the EDM coordinate system relative to the device coordinate system is defined in terms of pan (horizontal angle) and tilt (vertical angle).

Figure 6:
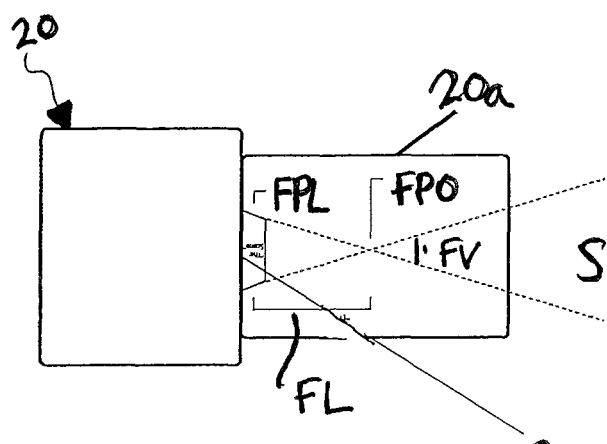
FIGS. 6 and 7 illustrate a camera coordinate system.
Figure 7:
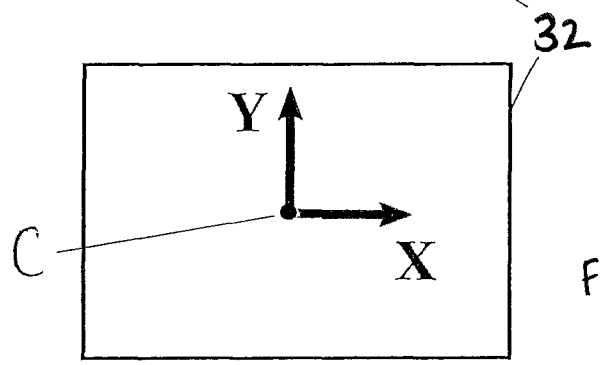

FIGS. 6 and 7 illustrate the camera coordinate system. This is attached to the camera 20. The origin is in the centre C of the image sensor 32. It moves in fixed registration with the EDM coordinate system. The camera extrinsic parameters define the relationship of this coordinate system to the EDM coordinate system. FIG. 6 also illustrates the camera lens 20a, focal plane FPL focal point FPO, focal length FL, field of view FV and the scene S.

Figure 8:
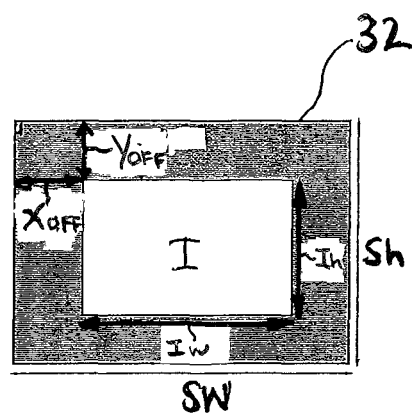
FIG. 8 illustrates a sensor coordinate system.

FIG. 8 illustrates the sensor coordinate system. This is the focal plane FPL of the camera 20 and the origin is at the centre of the sensor 32. FIG. 8 also illustrates the X and Y offset Xoff, Yoff between the image I and the sensor 32, the pixel size Ph, Pw, the image height and width Ih, Iw and the sensor height and width Sh, Sw.

Figure 9:
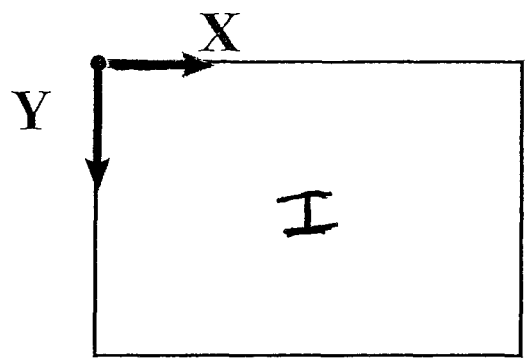
FIG. 9 illustrates an image coordinate system.

FIG. 9 illustrates the image coordinate system. This is related to the sensor coordinate system by pixel size Ph, Pw, cropping and binning settings.

Point Definition Module

This module can be used to define points for measuring, calibrating, etc. When a point is defined its corresponding appearance in the image may also be captured (as a 'snapshot'). The captured snapshot pattern can later be used by the point location module to automatically locate and track the position of a measurement point in the image using pattern recognition or feature detection algorithms.

Points can be defined via one of two ways:
1. The EDM 12 is aimed at the desired point. A distance measure is performed. The current direction of the EDM 12 together with the distance measure defines the 3D position of the point. The camera's intrinsic and extrinsic parameters are used to project this 3D position into a position in the image. The appearance of the point may then be captured as a snapshot at that image position.
2. The desired point is identified in the image. The appearance of the point may be captured as a snapshot at that image position. The EDM alignment module then aligns the EDM 12 with the desired point. A distance measure is performed. The current direction of the EDM 12 together with the distance measure defines the 3D position of the point.

Point Location Module

This module can automatically locate measurement points within an image using image processing algorithms, such as pattern recognition or feature detection algorithms. In order to locate the measurement point the appearance of the measurement point is known. The appearance of the measurement point can be:
  A known pattern such as a bulls-eye, a circle, or a cross that can be automatically located in the image using feature detection algorithms.
  A natural pattern. A snapshot of the pattern can be captured by the point definition module when the point is defined and then located in the image using pattern recognition algorithms such as those described in PCT/GB2003/004606.

Data Fusion Module

Data from the EDM 12, EDM direction sensors 16 and camera 20 are fused in order to make measurements. This can be achieved via a number of methods, each of which delivers a different measurement capability. The present inventors have identified that existing devices are only capable of making static measurements of a single point at a time, whereas the hybrid device 10 and methods presented here enable both dynamic measurement and measurement of multiple points simultaneously.

In order for the hybrid device 10 to operate it is preferred that self-calibration module (described below) is first used to calibrate the system in order to establish the intrinsic and extrinsic parameters of the camera 20. However, the intrinsic and extrinsic parameters of the camera 20 can be known from assembled settings, or ascertained in other ways as would be apparent to the skilled person.

The data fusion module can then operate in a number of modes.

Mode 1

Figure 10:
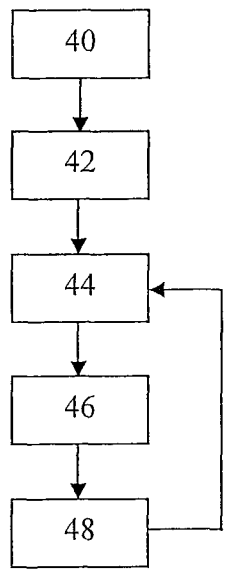
FIG. 10 is a flow chart of a first measurement mode of operation for the hybrid device of FIG. 1.

This mode enables dynamic monitoring of multiple points that are moving within a plane (the measurement plane'). Multiple points are monitored simultaneously. Referring to FIG. 10, the method for this mode is:

1) Setup
  a) At step 40 a measurement plane is defined as follows.
    i) The 3D positions of three or more points are defined using the point definition module.
    ii) The three or more points define the 3D measurement plane. If there are more than three points then a 'best-fit' plane is defined.
    iii) The origin of the measurement plane can optionally be set by defining a point using the point definition module and specifying the desired coordinate of that point within the plane's coordinate system.
    iv) The direction of the plane's X/Y axes can optionally be set by defining a line segment via two points using the point definition module and specifying the desired direction of that line segment in the plane's coordinate system.
  b) At step 42 one or more measurement points are defined using the point definition module. All measurement points lie on the measurement plane and remain on the plane as they move i.e. displacements are within the plane.

2) Measure
  a) At step 44 the point location module locates each measurement point in the image. If one or more measurement points have moved outside of the camera's field of view then the EDM 12 and therefore the camera can optionally be turned through a sequence of directions, such as through a spiral search pattern, in order to search for and then bring the measurement points back into the field of view to allow the point location module to locate them.
  b) At step 46 the current direction of the EDM 12 together with the camera's intrinsic and extrinsic parameters is used to project a ray from the focal point of the camera through the image coordinate of each located point. The image is 'tagged' or otherwise associated with the current direction of the EDM 12 during image exposure. Tagging is performed in the DSS 22. The 'current direction of the EDM' is known because the DSS 'tagged' the image with the direction at the time the image was exposed.
  c) At step 48 the rays are intersected with the measurement plane. The intersection of each ray with the measurement plane yields the current location of each measurement point. These can be presented as either a 3D coordinate of each point or a 2D coordinate of each point within the measurement plane. Steps 44 to 48 are repeated to provide a stream of measurement data; one measurement for each measurement point for each image from the camera.

Mode 2

Figure 11:
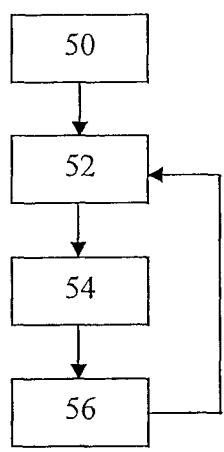
FIG. 11 is a flow chart of a second measurement mode of operation for the hybrid device of FIG. 1.

This mode enables static measurement of multiple points that may move in any direction. Multiple points are measured sequentially. Referring to FIG. 11, the method for this mode is:

1) Setup
   a) At step 50 one or more measurement points are defined using the point definition module.
2) Measure
   a) At step 52 the EDM 12 is turned to aim at the expected location of the measurement point. This could be the location where the point was defined, the location where the point was last measured or the location where the point is predicted to be based on prior knowledge, such as previous locations.
   b) At step 54 the point location module is used to locate the measurement point in the image. If the measurement point has moved outside of the camera's field of view then the EDM 12 and therefore the camera can optionally be turned through a sequence of directions, such as through a spiral search pattern, in order to search for and then bring the measurement point back into the field of view to allow the point location module to locate it.
   c) At step 56 the EDM alignment module is used to aim the EDM 12 at the point identified in the image by the point location module and provide the 3D location of the measurement point.
   d) Steps 52 to 56 are repeated for each measurement point.

Mode 3

Figure 12:
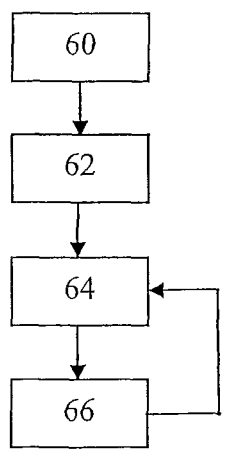
FIG. 12 is a flow chart of a third measurement mode of operation for the hybrid device of FIG. 1.

This mode enables dynamic measurement of a single point that may move in any direction. Referring to FIG. 12, the method for this mode is:

1) Setup
   a) At step 60 a measurement point is defined using the point definition module.
2) Measure
   a) At step 62 the EDM 12 is turned to aim at the expected location of the measurement point. This could be the location where the point was defined, the location where the point was last measured or the location where the point is predicted to be based on prior knowledge, such as previous locations).
   b) At step 64 the point location module is used to locate the measurement point in the image. Note that if the measurement point has moved outside of the camera's field of view then the EDM, and therefore the camera, can optionally be turned through a sequence of directions, such as through a spiral search pattern, in order to search for and then bring the measurement point back into the field of view to allow the Point location module to locate it.
   c) At step 66 the EDM alignment module is used to aim the EDM 12 at the point identified in the image by the Point location module and provide the 3D location of the measurement point.
   d) Steps 64 and 66 are repeated to provide a stream of measurement data; one measurement for each image from the camera.

Mode 4

Figure 13:
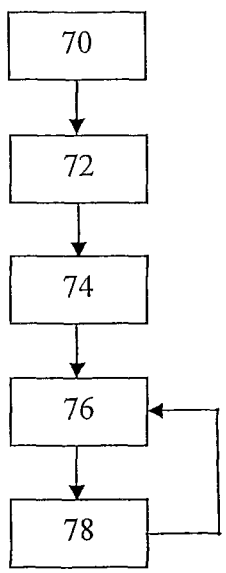
FIG. 13 is a flow chart of a fourth measurement mode of operation for the hybrid device of FIG. 1.

This mode enables dynamic measurement of multiple points that may move in any direction. Multiple points are measured simultaneously. This method requires two or more hybrid devices that are simultaneously monitoring a common set of points but only one of the hybrid devices requires an EDM. A synchronisation system ensures that images are captured synchronously by the multiple devices. Referring to FIG. 13, the method for this mode is:

1) Setup
   a) At step 70 the position and orientation of each hybrid device within a common world coordinate system is established using standard survey methods. For example, the hybrid device with the EDM 12 can be used to measure the 3D coordinates of multiple reference points within the world coordinate system. The measured direction of each reference point from each of the other hybrid devices enables the position and orientation of each hybrid device within the world coordinate system to be calculated.
   b) At step 72 one or more measurement points are defined using the Point Definition module. Each point is defined using a single hybrid device with EDM.
   c) At step 74 the 3D position of each defined point is projected into image coordinates for every other hybrid device. This allows features in the image that correspond to the same measurement point to be easily identified and/or a 'snapshot' of the natural appearance of the measurement point to be taken for every other hybrid device.
2) Measure
   a) At step 76 the point location modules locate each measurement point in the image for every hybrid device.
   b) At step 78 the 3D position of the measurement point is calculated. The known position and orientation of each hybrid device within the world coordinate system together with the intrinsic and extrinsic parameters of each camera and the located positions of each point in each image enables the 3D position of the measurement point to be calculated.
   c) Steps 76 and 78 are repeated to provide a stream of measurement data; one measurement for each measurement point for each image from the cameras.

Self-Calibration Module

This module enables simple, fast calibration of the intrinsic and extrinsic camera parameters, which can be performed in the field. The extrinsic parameters are with respect to the EDM coordinate system. The calibration method can calibrate both coaxially mounted and non-coaxially mounted cameras. It only requires a single calibration point and, in many cases, only two observations of that calibration point are required. The method does not depend on knowing the absolute position of the calibration point in the image to a great accuracy, rather it uses the point location module to precisely measure the displacement of the calibration point in the image and this can be achieved to a far greater accuracy and precision.

Figure 14:
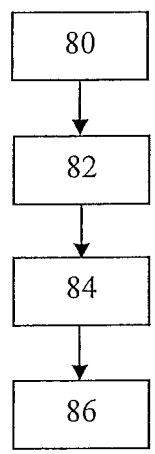
FIG. 14 is a flow chart of a method of self-calibration for the hybrid device of FIG. 1.

Referring to FIG. 14, the method comprises the following steps:

1. At step 80 the required input data is captured.
2. At step 82 the method solves for camera focal length and optionally lens distortion parameters.
3. At step 84 the method solves for camera roll relative to the EDM coordinate system.
4. At step 86 the method solves for camera pan/tilt relative to the EDM coordinate system.

Capture Required Input Data
1. Approximate values for the following are required:
   a. Position and orientation of the camera coordinate system with respect to the EDM coordinate system are required. These can typically be derived from the known mechanical design of the device and can be represented as three translation values and three rotation values.
   b. Focal length—value from lens specification can be used
   c. Pixel size—value from camera specification can be used
   d. Principal point—assumed to pass through centre of image sensor
   e. Distortion parameters—assume that the optics exhibit no distortion
2. A single calibration point is then chosen by the user. The 3D position of the calibration point in the device coordinate system must be known and this is typically ascertained by aiming the EDM 12 at the calibration point, performing a distance measure and combining this with the current EDM direction to calculate the 3D position. Note that the further the point is away from the camera, the more tolerant the method becomes to absolute errors in the known position of the calibration point or errors in the provided position of the camera coordinate system with respect to the EDM coordinate system.
3. If it is not already, the EDM 12 is turned to aim at the calibration point. The position of the calibration point within the image is then located, either manually or automatically. Even if the point is located manually, having located it once enables it to be located automatically in subsequent steps for example by taking a 'snapshot' of the appearance and then using the Point location module to automatically locate the point.
4. If the optics have been aligned such that the optical axis is coaxial with the EDM 12 laser then:
   The position of the calibration point within the image is recorded $(x_0, y_0)$. The pan and tilt angles of the EDM direction are recorded ($h_0$ and $v_0$). The estimate of the location of the principal point can be updated to $(x_0, y_0)$.
   Otherwise:
   The camera is turned until the calibration point is approximately aligned with the principal point in the image. The approximate values provided in (1) allow this turn to be performed automatically. The Point location module is then used to locate the calibration point in the image. The position of the calibration point within the image is recorded $(x_0, y_0)$. The pan and tilt angles of the EDM direction are recorded ($h_0$ and $v_0$).
5. The EDM 12 is then tilted such that the calibration point moves in the image. The greater the movement in the image the more accurate the calibration will be so it is beneficial (but not required) to tilt until the calibration point is close to the edge of the image. The approximate values provided in (1) allow this turn to be performed automatically. The Point location module is then used to locate the calibration point in the image. The position of the calibration point within the image is recorded $(x_1$ and $y_1)$. The pan and tilt angles of the EDM direction are recorded ($h_1$ and $v_1$).
6. Step (5) can optionally be repeated for a range of tilt and/or pan angles.

Solve for Camera Focal Length
Using a pin-hole camera model allows the focal length to be directly calculated:

Focal length=pixel size $x|(x_1,y_1)-(x_0,y_0)|/\mathrm{Tan}(\theta)$

Where,
$\theta$ is the angle between $r_0$ and $r_1$
$r_0$ is the ray corresponding to the optical axis when the EDM direction is at $h_0$ and $v_0$
$r_1$ is the result of rotating $r_0$ around the EDM origin according to $(h_1-h_0)$ and $(v_1-v_0)$ If additional observations were recorded in step 6 then a parameterised lens distortion model can also be solved for. The general approach is to formulate an error function in terms of the discrepancies between observed image coordinates and projected image coordinates (projected using the current distortion parameters) and then applying standard optimisation techniques to solve for the parameters that minimise the error function.

If the optics have not been aligned such that the optical axis is coaxial with the EDM 12 laser and the distortion parameters have been solved for, then the centre of radial distortion can be taken as an estimate of the principal point.

Solve for Camera Roll Relative to the EDM Coordinate System

The two sets of image coordinates recorded in steps 4 and 5 above define a line segment. Providing the EDM 12 was tilted such that the calibration point followed a linear path in the image from $(x_0,y_0)$ to $x_1,y_1$), then the direction of the line $(\mathrm{Tan}^{-1}((y_1-y_0)/(x_1-x_0)))$ is directly related to the angle of roll of the camera within the EDM 12 coordinate system. Measuring the direction of the line therefore allows the angle of roll to be directly calculated.

Solve for Camera Pan/Tilt Relative to the EDM Coordinate System

This step is only relevant if the optics have not already been aligned such that the optical axis is coaxial with the EDM 12 laser.

The estimates for focal length, camera roll and principal point are updated with the values calculated above. If the lens distortion parameters have been calculated then these are updated too.

The updated parameters are used to project the known 3D position of the calibration point back into image coordinates. The projected position is then compared to the located position with any difference being directly related to the pan and tilt angles of the camera within the EDM coordinate system.

EDM Alignment Module

In order to fuse data from the camera 20 and EDM 12 it is frequently required to aim the EDM 12 at a point on a surface that corresponds to a specific point in the image. It is preferred that the self-calibration module has first have been used to calibrate the intrinsic and extrinsic parameters of the camera 20.

Figure 15:
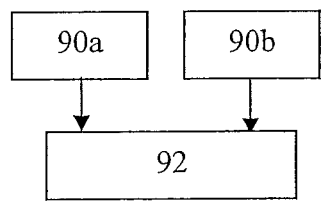
FIG. 15 is a flow chart of a method of EDM alignment for the hybrid device of FIG. 1.

Referring to FIG. 15, the method of aligning the EDM 12 with a specific point in the image first depends on whether the optical axis of the camera 20 is coaxial with the direction of the EDM 12:

1. If the camera is coaxial with the EDM 12 then at step 90a the camera intrinsic and extrinsic parameters are used to project the current EDM direction back to an EDM target point in the image. The EDM 12 is then turned until the specified point in the image is moved to the same position in the image as the EDM target point.
2. If the camera is not coaxial with the EDM 12 then parallax effects make it more difficult to align the EDM

12 with the specified point in the image. The degree of parallax depends on the distance to the measurement point, the problem being that this distance is unknown. In this case, at step 90*b* a method such as described below can be employed.

Using the camera intrinsic and extrinsic parameters together with the known direction of the EDM 12 at the time the image was captured enables the point in the image to be projected out as a 3D ray or 'camera ray' in world coordinates.

The EDM 12 is then turned to aim at a point along that ray and a distance measure is performed. The distance measure and the current EDM direction yield an EDM target point. The perpendicular distance of the EDM target point from the camera ray is calculated. The orientation of the EDM 12 is then adjusted until the distance of the EDM target point from the camera ray is as small as possible. This can be achieved via an iterative optimisation procedure in which case the iterations are terminated when one or more of the following conditions are met:

the EDM target point is within a tolerance of the camera ray.

the angular change in orientation of the EDM 12 at each iteration is smaller than the resolution of the orientation drive system or direction sensors.

the number of iterations has exceeded a pre-determined limit.

At step 92, once the EDM 12 is aligned there are two options:
1. The current EDM direction together with a distance measure yields the 3D coordinate of the point; or
2. The point along the camera ray that is closest to the EDM target point defines the 3D coordinate of the point.

In cases where the angular resolution of the camera exceeds that of the EDM drive system 18 or direction sensors 16 the second method is preferably adopted as this increases the potential measurement resolution of the system.

Camera Auto-Exposure Module

Measurement accuracy and robustness is susceptible to changing illumination. Changing solar illumination is a major cause. This module includes an auto-exposure algorithm configured to adjust the camera's exposure based on the pixel intensities within a portion of the image I. For example, if the average pixel intensity in the image is too dark it will lengthen the exposure time, or open the aperture or increase the gain, in order to brighten the image. These features are well known in the art.

Figure 16:
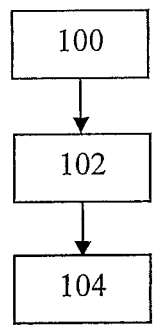
FIG. 16 is a flow chart of an auto-exposure method for the hybrid device of FIG. 1.

Referring to FIG. 16, at step 100 one or more regions of interest (ROIs) are identified within the image I. Each ROI corresponds to a feature within the image I. The ROIs can be identified by a user, or can be set automatically based on the location of the feature(s).

At step 102 the auto-exposure algorithm processes the only pixels within the ROI.

At step 104 a determination is made as to whether a feature has moved outside of its ROI. If so, the ROI associated with the feature is moved so that the feature is returned to the ROI. Step 104 is repeated.

This method therefore uses the current location of the measurement points in the image to continually update the auto-exposure ROIs such that they are always kept in registration with the location of the measurement points in the image. Whilst performing measurements the point location module provides the current location of each measurement point in the image. However, if the Point location module is unable to locate a point, then either the 'last seen' position, the 'defined' position or the predicted position is used but in these cases the pixels intensities associated with those regions are given a lower weighting compared to those where the Point location module was able to find the point. If no measurement points are within the field of view then a default area, such as the whole image, is used for the ROI. The method increases the likelihood that the exposure of the measurement points is optimal within the image I.

While the hybrid device 10 of the illustrated embodiments includes each of the described modules, in other embodiments a hybrid device may include one or more of the described modules. In an embodiment, the hybrid device or measuring device can comprise: an image capture device operable to output digital images and being arranged to be coupled to an EDM such that the ICD moves in fixed registration with respect to the EDM; and a controller arranged to receive data from the one or more sensors and the ICD, the controller being configured to: a) associate an image with the orientation of the EDM during exposure of the image; b) locate one of the measurement points within the image; and c) use the location of the measurement point within the image in combination with the EDM orientation to establish the direction of the measurement point with respect to the measuring device.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" does not exclude the presence of elements or steps other than those listed in any claim or the specification as a whole. The singular reference of an element does not exclude the plural reference of such elements and vice-versa. Parts of the invention may be implemented by means of hardware comprising several distinct elements, or by a suitably programmed computer. In a device claim enumerating several parts, several of these parts may be embodied by one and the same item of hardware. The mere fact that certain measures are recited in mutually different dependent claims does not indicate that a combination of these measures cannot be used to advantage.

The invention claimed is:

1. A hybrid measuring device, the hybrid measuring device comprising:
an image capture device (ICD) operable to output digital images and being arranged to be coupled to a non-contact distance measuring device such that the ICD moves in known registration with respect to the non-contact distance measuring device;
a controller arranged to receive data from (i) one or more sensors for determining an orientation of the non-contact distance measuring device and (ii) the ICD; and
an automated drive system responsive to the controller for controlling the orientation of the non-contact distance measuring device,
wherein the controller being configured to:
a) associate an image with the orientation of the non-contact distance measuring device during exposure of the image;
b) locate one of the measurement points within the image; and
c) use the location of the measurement point within the image in combination with the orientation of the non-contact distance measuring device to establish the direction of the measurement point with respect to the hybrid measuring device.

2. A hybrid measuring device according to claim 1, further comprising:
the non-contact distance measuring device; and
the one or more sensors for determining the orientation of the non-contact distance measuring device.

3. A hybrid measuring device according to claim 1, wherein the controller is arranged to receive data from the non-contact distance measuring device and is configured to associate the image with the non-contact distance measuring device distance reading during exposure of the image.

4. A hybrid measuring device according to claim 1, wherein the controller is configured to capture the appearance of a measurement point for subsequent location within the image by one or more of:
projecting a non-contact distance measuring device target point into a position in the image and capturing the appearance of the measurement point; and
capturing the appearance of a region within the image which is identified as corresponding to the measurement point.

5. A hybrid measuring device according to claim 1, wherein the optical axis of the ICD is coaxial with non-contact distance measuring device measurement axis and the controller is configured to perform a non-contact distance measuring device alignment function comprising using intrinsic and extrinsic parameters of the ICD to project a current direction of the non-contact distance measuring device into the image as a non-contact distance measuring device target point and control the drive system to align the non-contact distance measuring device target point with a measurement point in the image.

6. A hybrid measuring device according to claim 5, wherein the controller is configured to perform a measurement function comprising:
using the current direction of the non-contact distance measuring device together with a distance measurement to obtain a three dimensional coordinate of the non-contact distance measuring device target point which now corresponds to the measurement point; or
using a point along the ICD ray that is closest to the non-contact distance measuring device target point to obtain a three dimensional coordinate for the measurement point.

7. A measuring device according to claim 6, wherein the controller is configured to:
i) if required, control the drive system to turn the non-contact distance measuring device such that the measurement point is within the image;
j) locate the measurement point within the image; and
k) perform the non-contact distance measuring device alignment function followed by the measurement function to provide the 3D location of the measurement point.

8. A hybrid measuring device according to claim 7, wherein the controller is configured to repeat steps i) to k) for each of a plurality of the measurement point sequentially.

9. A hybrid measuring device according to claim 7, wherein the controller is configured to repeat steps j) and k) for a single one of the measurement points to provide a stream of measurement data comprising a measurement for each of a sequence of images from the ICD.

10. A measuring device according to claim 7, wherein the controller is configured such that if one or more of the measurement points cannot be located within the image then the non-contact distance measuring device is turned through a sequence of directions in order to search for and then bring the measurement points back into the field of view for location.

11. A hybrid measuring device according to claim 1, wherein the optical axis of the ICD is not coaxial with non-contact distance measuring device measurement axis and the controller is configured to perform a non-contact distance measuring device alignment function comprising:
(d) use intrinsic and extrinsic parameters of the ICD together with the orientation of the non-contact distance measuring device during exposure of the image to project a measurement point in the image out as a three dimensional ICD ray in world coordinates;
(e) control the drive system to align the non-contact distance measuring device with a point on the ICD ray and then perform a distance measurement;
(f) obtain a non-contact distance measuring device target point corresponding to the measured distance and the current direction of the non-contact distance measuring device;
(g) calculate the perpendicular distance of the non-contact distance measuring device target point from the ICD ray; and
(h) perform an optimisation procedure that repeats steps (e) to (g) one or more times in order to find a non-contact distance measuring device direction that reduces the distance of the non-contact distance measuring device target point from the ICD ray.

12. A hybrid measuring device according to claim 11, wherein the optimisation procedure comprises repeating steps (e) to (g) until one or more of the following termination criteria is met:
the perpendicular distance of the non-contact distance measuring device target point from the ICD ray is relatively small;
the angular change in orientation of the non-contact distance measuring device at an iteration is smaller than the resolution of the drive system or non-contact distance measuring device direction sensors; and
the number of iterations has exceeded a predefined limit.

13. A hybrid measuring device according to claim 1, wherein the controller is configured to account for a change in non-contact distance measuring device direction or distance during the exposure period by:
using a single direction and/or distance reading from a point during the exposure period, or
using multiple readings taken during the exposure period.

14. A hybrid measuring device according to claim 1, comprising a light the direction of which is aligned with the optical axis of the ICD, the light being mechanically coupled to the ICD to move in fixed registration with the ICD.

15. A hybrid measuring device according to claim 14, wherein the angle of illumination approximately matches the angular field of view of the ICD.

16. A hybrid measuring device according to claim 1, comprising an integrated optical filter that filters the light entering the camera and/or the light can be matched to emit at this frequency in order to fill the gap in the Sun's emission spectrum.

17. A hybrid measuring device according to claim 1, wherein the controller is configured to perform dynamic monitoring of a plurality of measurement points that are moving within a 3D measurement plane by:
locating each of the measurement points within the image;
use the current direction of the non-contact distance measuring device together with the ICD's intrinsic and extrinsic parameters to project a ray from the focal point of the ICD through the image coordinate of each located point such that the rays are intersected with the measurement plane.

18. A measuring device according to claim 1, wherein the controller is configured to:
perform an auto-exposure process on one or more regions of interest (ROI) defined within the image, each ROI containing a measurement point; and
move an ROI in accordance with measured movement of the associated measurement point and/or in accordance with non-contact distance measuring device direction data from the one or more sensors.

19. An array of measuring devices comprising:
a first measuring device according to claim 1;
one or more further measuring devices each being configured to determine the direction of one or more measurement points relative to the further measuring device, each further measuring device comprising:
an ICD operable to output digital images;
one or more sensors for determining the orientation of the ICD; and
a controller arranged to receive data from the one or more sensors and the ICD, the controller being configured to:
(l) associate an image with the orientation of the ICD during exposure of the image; and
(m) locate one of the measurement points within the image; and
(n) use the location of the measurement point within the image in combination with the ICD orientation to establish the direction of the measurement point with respect to the further measuring device; and
a synchronisation system configured to cause images to be captured synchronously by the first measuring device and the one or more further measuring devices, wherein:
(o) the controller of the first measuring device is configured to project the three dimensional positions of a plurality of measurement points into image coordinates for every other measurement device;
(p) the controller of each measurement device is configured to locate each measurement point in its respective image; and
(q) one of the controllers is configured to use a known position and orientation of each measurement device within the world coordinate system together with intrinsic and extrinsic parameters of each ICD and the located position of each point in each image to determine the 3D position of each measurement point to be calculated relative to the measurement devices,
such that steps (p) and (q) can be repeated to provide a stream of measurement data; one measurement for each image from the ICD of each measuring device.

20. A method of simultaneously determining the location of a plurality of measurement points relative to an array according to claim 19, the method comprising:
(o) projecting the three dimensional positions of a plurality of measurement points in an image captured by one of measurement devices into image coordinates for every other measurement device;
(p) locating each measurement point the image of every other measurement device; and
(q) using a known position and orientation of each measurement device within the world coordinate system together with intrinsic and extrinsic parameters of each ICD and the located position of each point in each image to determine the 3D position of each measurement point.

21. A method of calibrating intrinsic and extrinsic image capture device (ICD) parameters for a measuring device, which is a measuring device according to claim 1, comprising an ICD which is operable to output digital images and is coupled to a non-contact distance measuring device non-contact distance measuring device such that the ICD moves in fixed registration with respect to the non-contact distance measuring device, the intrinsic parameters describing parameters of the ICD, the extrinsic parameters describing the position and orientation of the ICD coordinate system with respect to the non-contact distance measuring device coordinate system, the method comprising:
(a) establishing a first approximation of:
the position and orientation of the ICD coordinate system with respect to the non-contact distance measuring device coordinate system;
the ICD focal length; the ICD pixel size;
a principal point, the principal point being defined by the point of intersection of the optical axis with the ICD image sensor, the first approximation optionally being taken to be at the centre of the ICD image sensor; and
the ICD distortion parameters;
(b) selecting a calibration point having a known three dimensional position with respect to the distance measuring device;
(c) locating the calibration point within the image to record a location (x0, y0);
(d) recording pan and tilt angles of the non-contact distance measuring device direction (h0 and v0);
(e) optionally updating the first approximation of the principal point to equate to (x0, y0);
(f) changing the orientation of the non-contact distance measuring device so that the calibration point moves within the image;
(g) locating the calibration point within the image and recording the image coordinates of the calibration point (x1, y1) and the pan and tilt angle of the non-contact distance measuring device (h1 and v1);
(h) solving for ICD focal length, whereby solving for ICD focal length comprises:
calculating the focal length using a pin-hole camera model; and
(i) solving for ICD roll relative to the non-contact distance measuring device coordinate system, whereby solving for ICD roll relative to the non-contact distance measuring device coordinate system comprises:
defining a line segment intersecting (x0, y0) and (x1, y1); and
measuring the direction of the line to calculate the angle of roll.

22. A method according to claim 21, further comprising:
(j) solving for ICD pan and tilt relative to the non-contact distance measuring device coordinate system, whereby solving for ICD pan and tilt relative to the non-contact distance measuring device coordinate system comprises:
updating the first approximations for focal length, ICD roll and principal point obtained in step (a) with the corresponding values obtained in steps (g), (h) and (e);
using the updated parameters to project the known 3D position of the calibration point back into image coordinates (x2, y2); and comparing the projected position (x2, y2) to the located position (xl, yl) to establish a difference (x2−xl, y2−yl) which is directly related to the pan and tilt angles of the ICD within the non-contact distance measuring device coordinate system.

23. A method of operating a hybrid measuring device, the hybrid measuring device comprising:

an image capture device (ICD) operable to output digital images and being arranged to be coupled to a non-contact distance measuring device such that the ICD moves in known registration with respect to the non-contact distance measuring device; and a controller arranged to receive data from (i) one or more sensors for determining an orientation of the non-contact distance measuring device and (ii) the ICD;

controlling a drive system to align the non-contact distance measuring device target point with a measurement point in the image, the controller being configured to perform one or more steps of the method, the method comprising:

a) associating an image with the orientation of the non-contact distance measuring device during exposure of the image;

b) locating one of the measurement points within the image; and c) using the location of the measurement point within the image in combination with the orientation of the non-contact distance measuring device to establish the direction of the measurement point with respect to the hybrid measuring device.

24. A method according to claim 23, further comprising:

capturing the appearance of a measurement point for subsequent location within the image by one or more of:

projecting a non-contact distance measuring device target point into a position in the image and capturing the appearance of the measurement point; and capturing the appearance of a region within the image which is identified as corresponding to the measurement point.

25. A method according to claim 23, further comprising a step of:

performing a non-contact distance measuring device alignment function by using intrinsic and extrinsic parameters of the ICD to project a current direction of the non-contact distance measuring device into the image as a non-contact distance measuring device target pointy.

26. A method according to claim 23, further comprising:

(d) using intrinsic and extrinsic parameters of the ICD together with the orientation of the non-contact distance measuring device during exposure of the image to project a measurement point in the image out as a three dimensional ICD ray in world coordinates;

(e) controlling a drive system to align the non-contact distance measuring device with a point on the ICD ray and then perform a distance measurement;

(f) obtaining a non-contact distance measuring device target point corresponding to the measured distance and the current EDM direction;

(g) calculating the perpendicular distance of the non-contact distance measuring device target point from the ICD ray; and (h) performing an optimisation procedure that repeats steps (e) to (g) one or more times in order to find an EDM direction that reduces the distance of the non-contact distance measuring device target point from the ICD ray.

27. A method according to claim 23, further comprising:

locating each of the measurement points within the image; and using the current direction of the non-contact distance measuring device together with the ICD's intrinsic and extrinsic parameters to project a ray from the focal point of the ICD through the image coordinate of each located point such that the rays are intersected with the measurement plane.

28. A method according to claim 23, further comprising:

i) if required, controlling a drive system to turn the non-contact distance measuring device such that the measurement point is within the image;

j) locating the measurement point within the image; and k) aligning the a non-contact distance measuring device target point with the measurement point and performing a measurement function to obtain a three dimensional coordinate for the measurement point.

29. A method according to claim 28, further comprising:

repeating steps i) to j) for each of a plurality of measurement points sequentially.

30. A method according to claim 28, further comprising:

repeating steps j) and k) for a single one of the measurement points to provide a stream of measurement data, such as one measurement for each of a sequence of images from the ICD.

* * * * *